United States Patent
Maekita

(10) Patent No.: US 12,521,264 B2
(45) Date of Patent: Jan. 13, 2026

(54) KNEE MOVEMENT SUPPORT DEVICE

(71) Applicant: TOYOTA JIDOSHA KABUSHIKI KAISHA, Toyota (JP)

(72) Inventor: Tomoe Maekita, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 837 days.

(21) Appl. No.: 17/825,406

(22) Filed: May 26, 2022

(65) Prior Publication Data

US 2022/0409414 A1  Dec. 29, 2022

(30) Foreign Application Priority Data

Jun. 24, 2021  (JP) .................................. 2021-104968

(51) Int. Cl.
*A61F 5/00* (2006.01)
*A61F 5/01* (2006.01)

(52) U.S. Cl.
CPC .... *A61F 5/0125* (2013.01); *A61F 2005/0169* (2013.01)

(58) Field of Classification Search
None
See application file for complete search history.

(56) References Cited

U.S. PATENT DOCUMENTS

| 5,624,389 | A | 4/1997 | Zepf |
| 6,471,664 | B1 * | 10/2002 | Campbell ............ A61F 5/0123 602/26 |
| 7,507,215 | B2 | 3/2009 | Ryan |
| 2014/0148746 | A1 * | 5/2014 | Pflaster ................... A61D 9/00 602/16 |
| 2016/0184165 | A1 | 6/2016 | Ohta et al. |
| 2016/0270997 | A1 | 9/2016 | Little et al. |
| 2016/0374844 | A1 * | 12/2016 | DeHarde ................ F16F 15/04 602/16 |
| 2018/0200136 | A1 | 7/2018 | Yamazaki |
| 2019/0298550 | A1 | 10/2019 | Rumpler et al. |
| 2021/0244601 | A1 * | 8/2021 | Maekita ................ A61B 5/112 |

FOREIGN PATENT DOCUMENTS

| CN | 111228101 A | 6/2020 |
| JP | 2013-236741 A | 11/2013 |
| JP | 2016-120273 A | 7/2016 |
| JP | 2018-114175 A | 7/2018 |
| WO | WO-2011057790 A1 * | 5/2011 ............ A61F 2/64 |

OTHER PUBLICATIONS

WO-2011057790-A1 translation (Year: 2011).*

* cited by examiner

*Primary Examiner* — Kim M Lewis
(74) *Attorney, Agent, or Firm* — Oliff PLC

(57) ABSTRACT

A knee movement support device according to one embodiment of the present disclosure is a knee movement support device that is worn on a leg of a user. The knee movement support device includes: a damper that provides resistance against a direction in which a knee joint of the leg bends; and an adjuster that is operated by a person to adjust the resistance from the damper.

7 Claims, 16 Drawing Sheets

KNEE MOVEMENT SUPPORT DEVICE

CROSS-REFERENCE TO RELATED APPLICATION

This application claims priority to Japanese Patent Application No. 2021-104968 filed on Jun. 24, 2021, incorporated herein by reference in its entirety.

BACKGROUND

1. Technical Field

The present disclosure relates to knee movement support devices, for example, a knee movement support device that is worn on a user's leg.

2. Description of Related Art

For example, when a user such as a hemiplegic patient does walking training, a knee movement support device is worn on the affected leg of the user in order to reduce buckling of the knee (knee suddenly giving way) of the affected leg. As disclosed in Japanese Unexamined Patent Application Publication No. 2018-114175 (JP 2018-114175 A), such a knee movement support device includes: an upper leg link that is fastened to the upper leg of the affected leg of the user; a lower leg link that is connected to the upper leg link via a knee joint portion and fastened to the lower leg of the affected leg; and a motor unit that drives the knee joint portion. The knee movement support device is configured to generate resistance to reduce buckling of the knee of the affected leg of the user using a driving force of the motor unit.

SUMMARY

Since typical knee movement support devices are configured to generate resistance by a motor unit, the resistance cannot be easily adjusted by a person from the outside.

The present disclosure implements a knee movement support device in which resistance can be easily adjusted by a person from the outside.

An aspect of the present disclosure relates to a knee movement support device that is worn on a leg of a user. The knee movement support device includes: a damper that provides resistance against a direction in which a knee joint of the leg bends; and an adjuster that is operated by a person and is configured to adjust the resistance from the damper.

In the above aspect, the adjuster may be located above the damper.

In the above aspect, the knee movement support device may further include a driver connected to the damper such that the resistance from the damper is changed. The adjuster may be located on an output shaft of the driver.

In the above aspect, the knee movement support device may further include a case surrounding the damper. The case may have an opening that allows the adjuster to be operated from outside of the case.

In the above aspect, the opening may be located in an opposite portion of the case from the user wearing the knee movement support device on the leg. The opening may be located on a front side of the case or on a rear side of the case, the front side is a front side in a front-rear direction of the user, the rear side is a rear side in the front-rear direction of the user.

In the above aspect, the case may have a plurality of holes that is smaller than a preset size.

According to the present disclosure, it is possible to implement a knee movement support device in which resistance can be easily adjusted by a person from the outside.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a specific embodiment to which the present disclosure is applied will be described in detail with reference to the drawings. However, the present disclosure is not limited to the following embodiment. The following description and the drawings have been simplified as appropriate for clarity.

Figure 1:
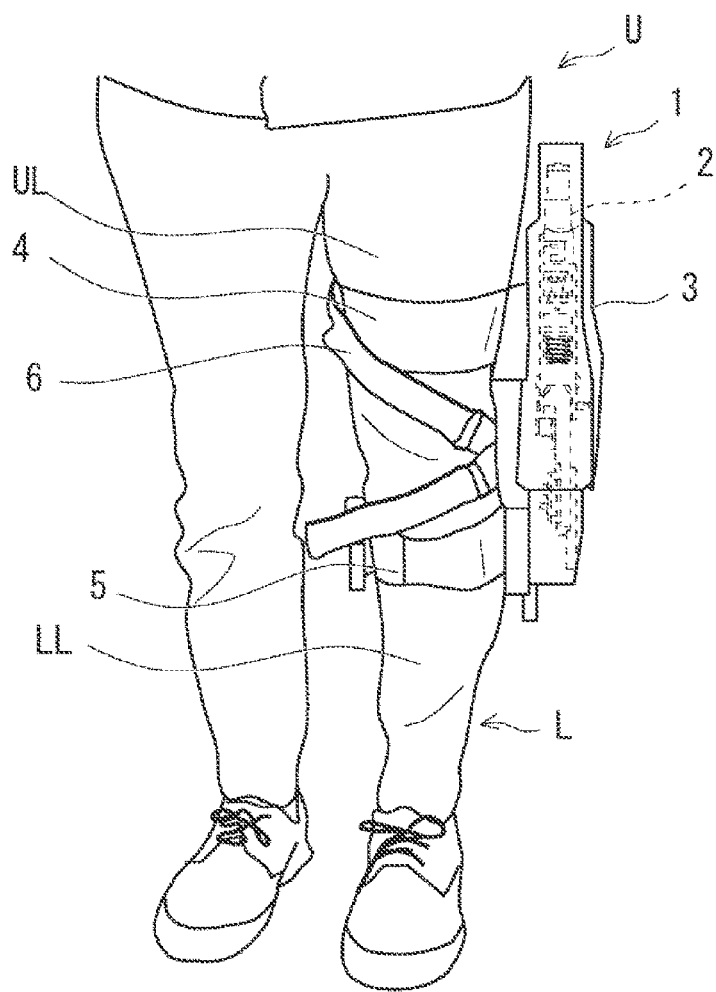
FIG. 1 shows a knee movement support device of an embodiment worn on a user's leg.

FIG. 1 shows a knee movement support device of an embodiment worn on a user's leg. As shown in FIG. 1, a knee movement support device 1 of the present embodiment includes a knee movement support device body 2, a case 3, an upper leg fastening unit 4, a lower leg fastening unit 5, and a support belt 6. The knee movement support device 1 is worn on an affected leg L of a user U such as a hemiplegic patient in order to reduce buckling of the knee of the affected leg L when, for example, the user U does walking training.

Figure 2:
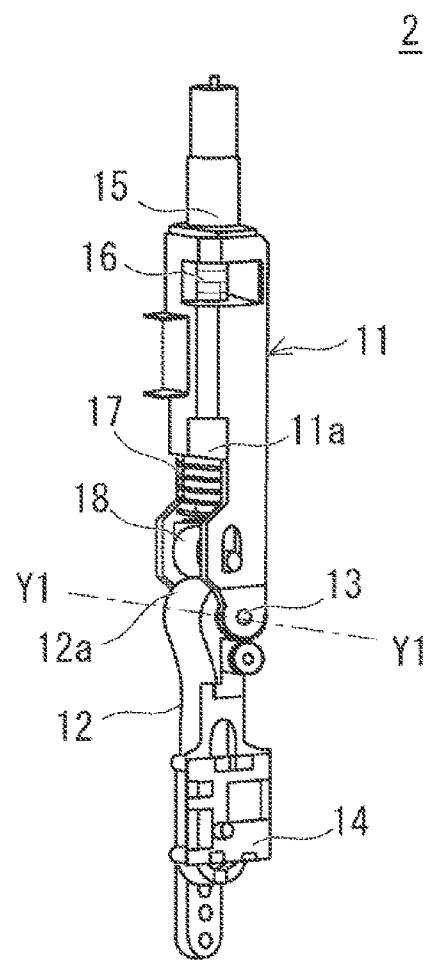
FIG. 2 is a perspective view of a knee movement support device body of the embodiment as viewed from the rear.
Figure 3:
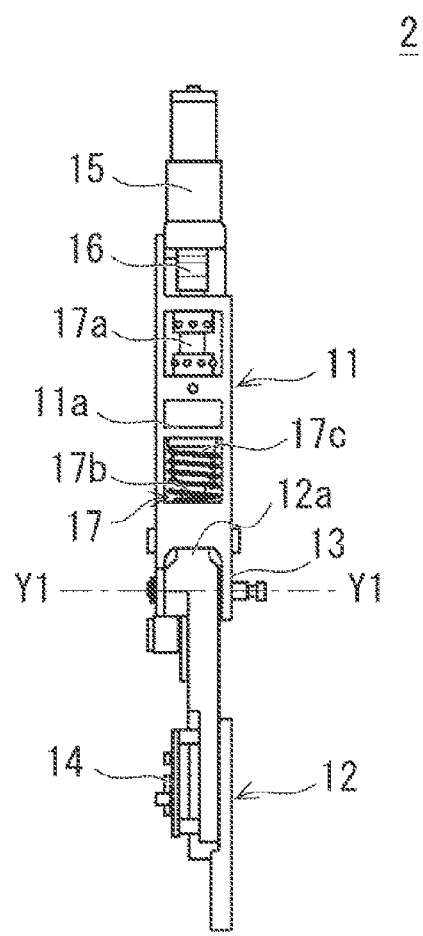
FIG. 3 is a front view of the knee movement support device body of the embodiment as viewed from the front.
Figure 4:
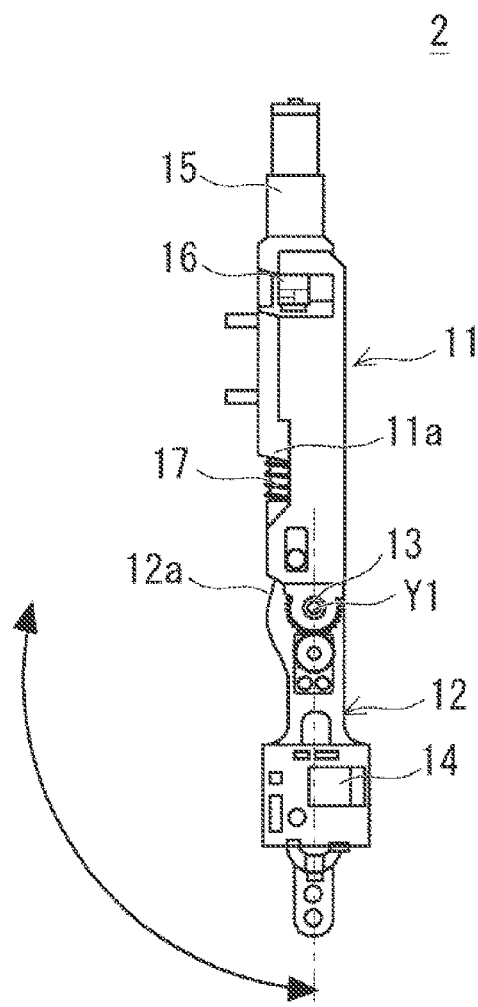
FIG. 4 is a side view of the knee movement support device body of the embodiment as viewed from the inner side.
Figure 5:
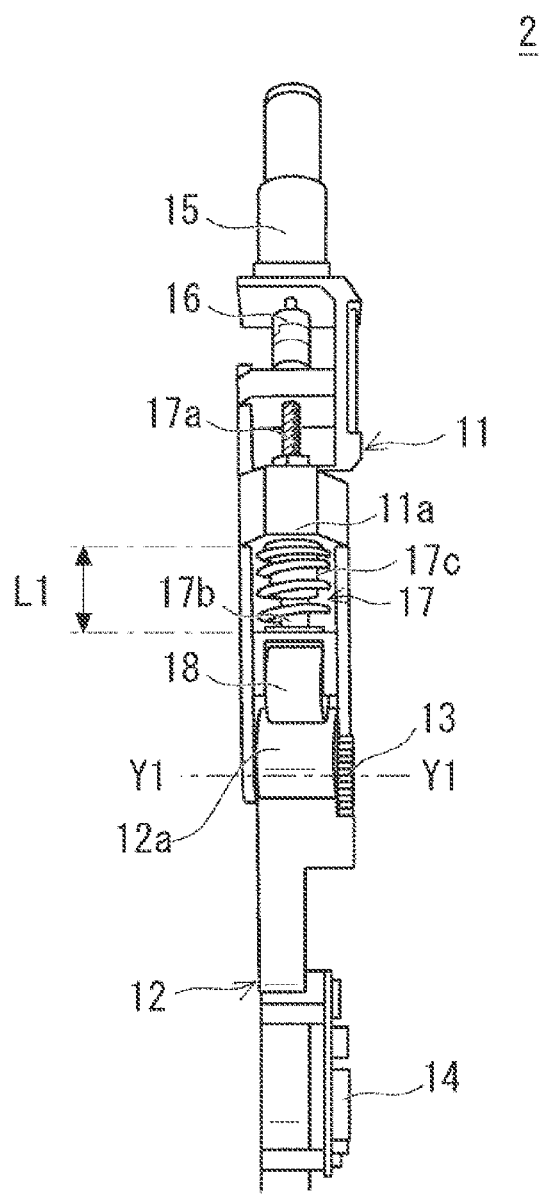
FIG. 5 is a perspective view of the knee movement support device body of the embodiment as viewed from the rear.
Figure 6:
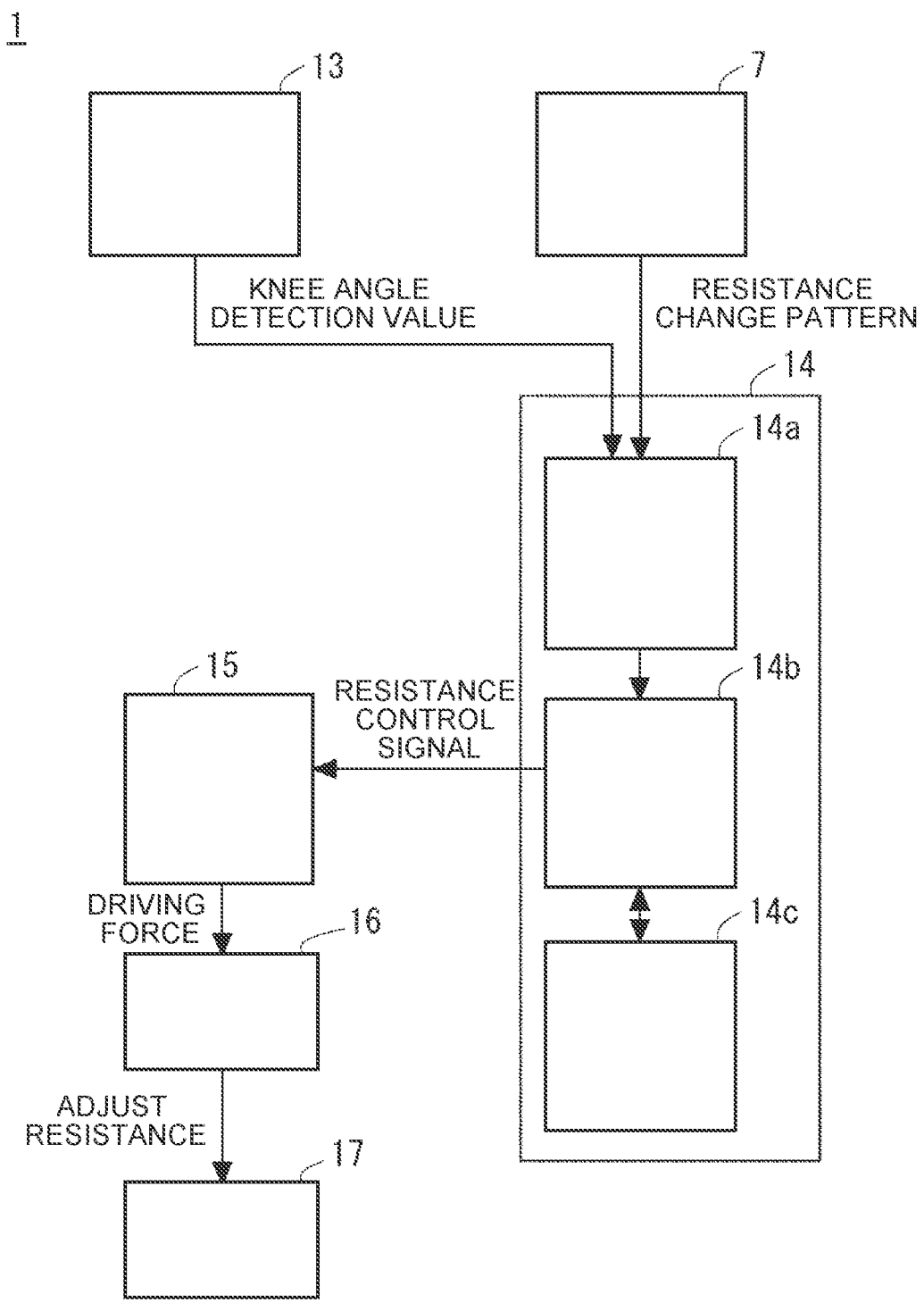
FIG. 6 is a block diagram showing a configuration of the knee movement support device of the embodiment.
Figure 7:
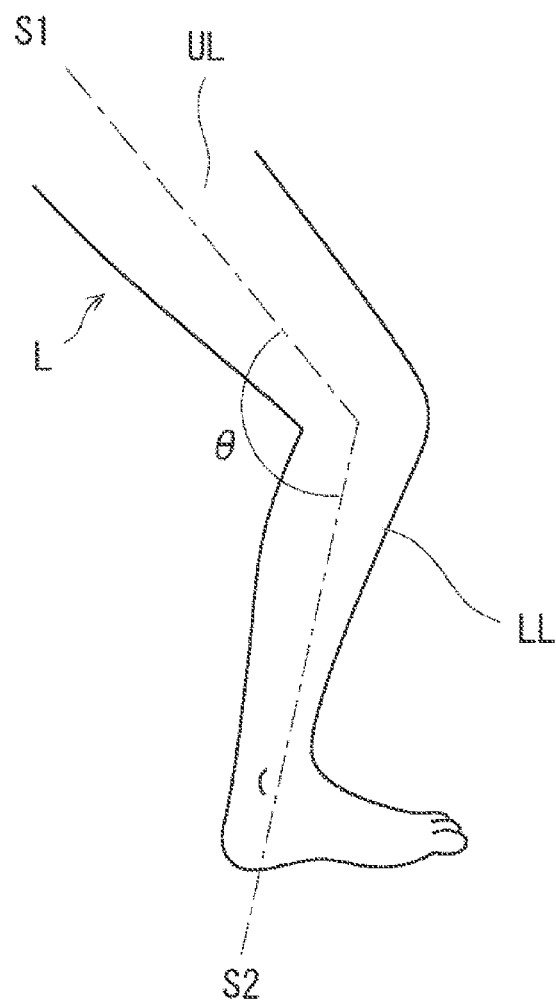
FIG. 7 illustrates a knee angle of the user.
Figure 8:
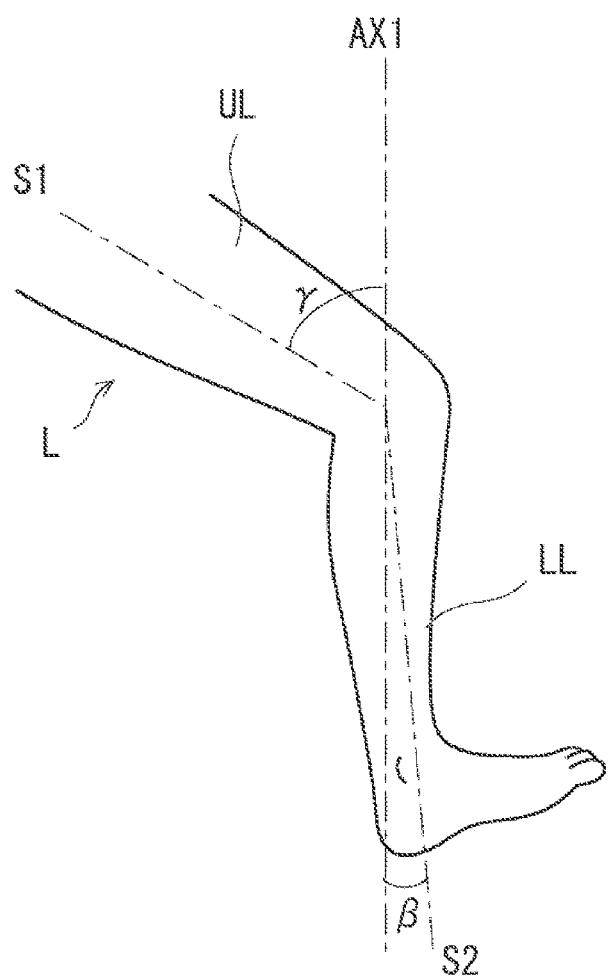
FIG. 8 illustrates a lower leg angle and an upper leg angle.

In the following description, the side of the knee movement support device 1 that faces the affected leg L of the user U when the knee movement support device 1 is worn on the affected leg L is referred to as the inner side of the knee movement support device 1, and the opposite side of the knee movement support device 1 from the inner side is referred to as the outer side of the knee movement support device 1. FIG. 2 is a perspective view of a knee movement support device body of the embodiment as viewed from the rear. FIG. 3 is a front view of the knee movement support device body of the embodiment as viewed from the front. FIG. 4 is a side view of the knee movement support device body of the embodiment as viewed from the inner side. FIG. 5 is a perspective view of the knee movement support device body of the embodiment as viewed from the rear. FIG. 6 is a block diagram showing a configuration of the knee movement support device of the embodiment. FIG. 7 illustrates a knee angle of the user. FIG. 8 illustrates a lower leg angle and an upper leg angle.

As shown in FIGS. 2 to 5, the knee movement support device body 2 includes an upper leg link 11 and a lower leg link 12. The lower end of the upper leg link 11 and the upper end of the lower leg link 12 are mechanically connected to each other so that the upper leg link 11 and the lower leg link 12 can rotate relative to each other about a rotation axis Y1. The upper end of the lower leg link 12 has a cam surface 12a.

The rotation angle between the upper leg link 11 and the lower leg link 12 is, for example, 0 (zero) degrees or more and 180 degrees or less. When the knee movement support device 1 is worn on the affected leg L of the user U, the upper leg link 11 is fastened to the upper leg UL of the affected leg L of the user U, and the lower leg link 12 is fastened to the lower leg LL of the affected leg L of the user U.

As shown in FIGS. 2 to 6, the upper leg link 11 or the lower leg link 12 includes a detection unit 13. The detection unit 13 is an angle sensor and detects the angle between the upper leg link 11 and the lower leg link 12.

When the knee movement support device body 2 is worn on the affected leg L of the user U, the angle between the upper leg link 11 and the lower leg link 12 corresponds to a knee angle θ of the user U. As shown in FIG. 7, the knee angle θ of the user U is formed by the intersection of a straight line S1 extending in the axial direction of the upper leg UL of the user U and a straight line S2 extending in the axial direction of the lower leg LL.

The detection unit 13 outputs the angle between the upper leg link 11 and the lower leg link 12 to a control device 14 as a knee angle detection value. The knee angle detection value has a waveform corresponding to the gait cycle. That is, the knee angle detection value changes periodically according to the gait cycle.

The detection unit 13 may include an inertial measurement unit etc. in addition to the angle sensor. The detection unit 13 can thus obtain a lower leg angle β and an upper leg angle γ based on the values detected by the inertial measurement unit and the angle sensor.

As shown in FIG. 8, the lower leg angle β is formed by the intersection of a vertical axis AX1 and the straight line S2 extending in the axial direction of the lower leg LL. The upper leg angle γ is formed by the intersection of the vertical axis AX1 and the straight line S1 extending in the axial direction of the upper leg UL. The detection unit 13 outputs the lower leg angle β and the upper leg angle γ to the control device 14.

The upper leg link 11 includes a drive unit 15, an operation unit 16, a damper 17, and a roller 18. The drive unit 15, the operation unit 16, the damper 17, and the roller 18 are held by the upper leg link 11 in this order from top to bottom.

The lower leg link 12 includes the control device 14. The control device 14 of the present embodiment is located on the inner surface of the lower leg link 12. As shown in FIG. 6, the hardware of the control device 14 is mainly composed of a microcomputer including a reception unit 14a, an arithmetic unit 14b, and a memory 14c.

For example, the reception unit 14a is connected to the detection unit 13 and a communication terminal 7 via communication means such as Bluetooth (registered trademark) Low Energy (BLE). The reception unit 14a receives the knee angle detection value from the detection unit 13.

The communication terminal 7 is, for example, a smartphone. The communication terminal 7 shows resistance change patterns that can be selected by a person such as the user U or a helper, receives an input indicating the resistance change pattern selected by the person, and sends the selected resistance change pattern to the reception unit 14a.

The reception unit 14a thus receives the resistance change pattern from the communication terminal 7. Various patterns can be used as the resistance change patterns. The resistance change patterns can be any patterns as long as they can reduce buckling of the knee of the affected leg L of the user U in a stance state.

The arithmetic unit 14b is, for example, a central processing unit (CPU) that performs arithmetic processing, control processing, etc. The memory 14c is, for example, a read-only memory (ROM) or a random access memory (RAM) that has stored therein arithmetic programs, control programs, etc. to be executed by the arithmetic unit 14b and that stores various kinds of data etc.

The arithmetic unit 14b can detect a gait timing based on the knee angle detection value etc. from the detection unit 13. Specifically, the gait timing is the stance phase and swing phase of a gait cycle.

The arithmetic unit 14b generates a resistance control signal based on the resistance change pattern and the knee angle detection value. The resistance control signal indicates a change in resistance from the damper 17 with time. The arithmetic unit 14b sends the generated resistance control signal to the drive unit 15 using wired communication or wireless communication. The control device 14 may acquire the angle between the vertical axis AX1 and the lower leg link 12 (lower leg angle β) and the angle between the vertical axis AX1 and the upper leg link 11 (upper leg angle γ) as appropriate.

The drive unit 15 is a drive device that applies rotational power to the operation unit 16 based on the resistance control signal from the control device 14. The drive unit 15 includes, for example, a motor and a driver circuit. The drive unit 15 may be located on the inner surface of the upper end of the upper leg link 11, and applies rotational power to the operation unit 16 via a gear or a pulley.

For example, as shown in FIG. 5, the basic form of the operation unit 16 is cylindrical, and the operation unit 16 is located between an output shaft of the drive unit 15 and a resistance changing shaft 17a protruding from the upper end of the damper 17. That is, the upper end of the operation unit 16 is connected to the output shaft of the drive unit 15, and the lower end of the operation unit 16 is connected to the resistance changing shaft 17a of the damper 17. At this time, the operation unit 16 is located in the upper part of the knee movement support device 1.

The operation unit 16 adjusts the resistance F of the damper 17 based on the rotational power from the drive unit 15 and a human operation as will be described later. Specifically, the operation unit 16 receives the rotational power from the drive unit 15 and the human operation and rotates the resistance changing shaft 17a of the damper 17 so that the sectional area of a flow path of damper fluid in the damper 17 changes accordingly.

The relationship among the resistance F of the damper 17, the damper coefficient k, and the rate v at which the damper fluid flows through the flow path is given by the following expression 1.

$$F=kv \qquad (1)$$

When the resistance changing shaft 17a of the damper 17 is rotated in one direction via the operation unit 16 according to the rotational power from the drive unit 15 or the human operation and the sectional area of the flow path of the damper fluid in the damper 17 decreases accordingly, the damper coefficient k increases, and as a result, the resistance F from the damper 17 increases.

On the other hand, when the resistance changing shaft 17a of the damper 17 is rotated in the other direction via the operation unit 16 according to the rotational power from the drive unit 15 or the human operation and the sectional area of the flow path of the damper fluid in the damper 17 increases accordingly, the damper coefficient k decreases, and as a result, the resistance F from the damper 17 decreases.

The damper 17 transmits the resistance F to the lower leg link 12 via the roller 18. As shown in FIG. 5, the damper 17 has substantially the same configuration as a typical damper, and includes a rod 17b and a spring 17c.

The rod 17b and the spring 17c are disposed between a damper holding portion 11a of the upper leg link 11 and the roller 18 such that the rod 17b and the spring 17c can expand and contract. The roller 18 is disposed between the damper 17 and the upper end of the lower leg link 12 such that the roller 18 can rotate and move in the vertical direction of the upper leg link 11.

Figure 9:
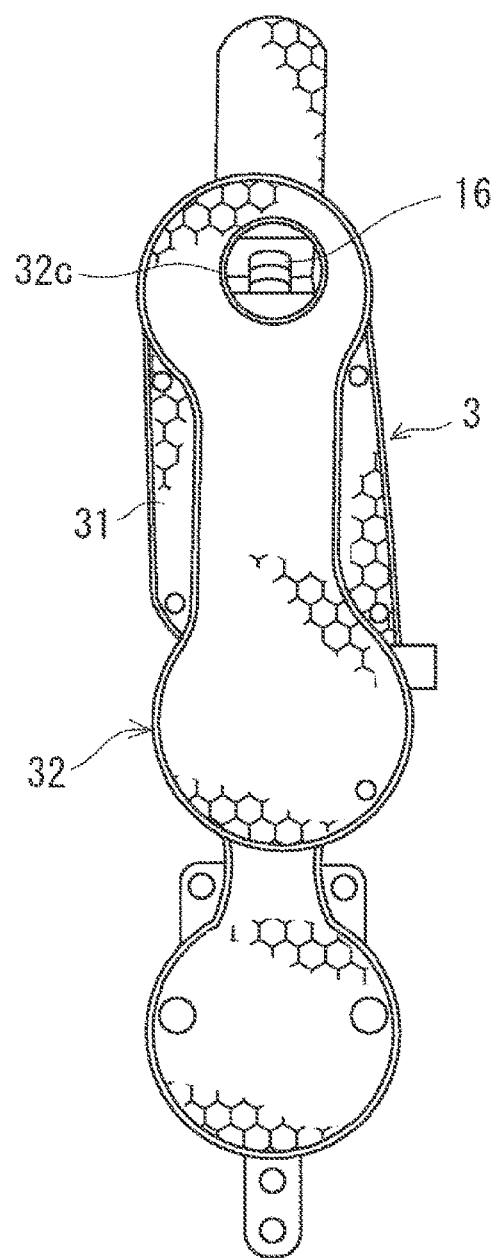
FIG. 9 shows a case of the knee movement support device of the embodiment covering the knee movement support device body, as viewed from the outer side of the case.
Figure 10:
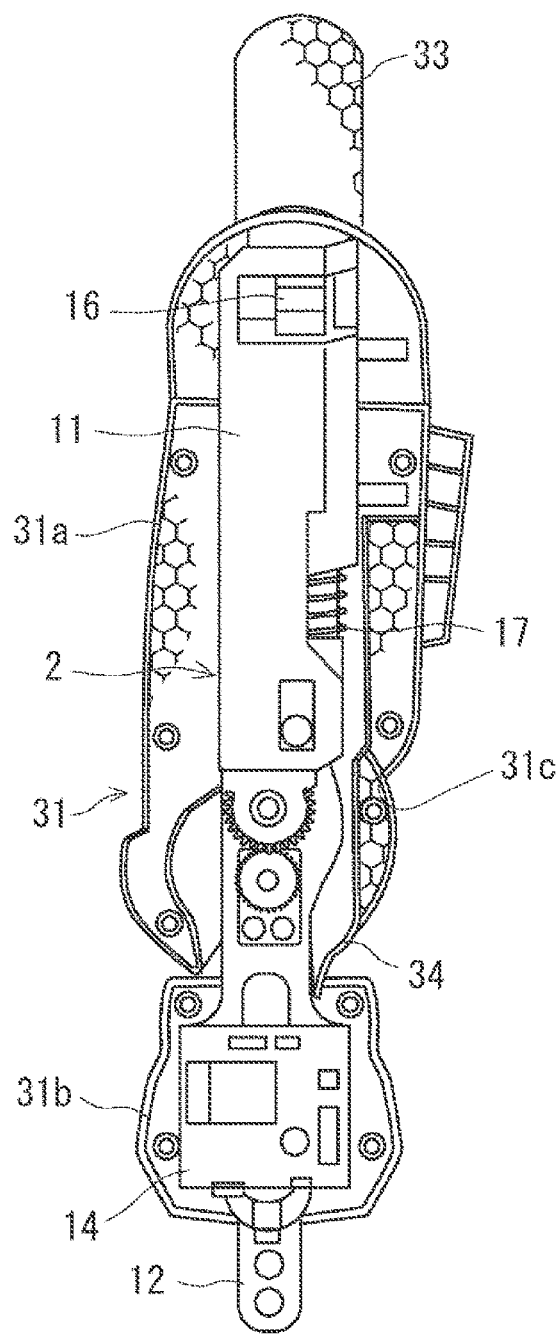
FIG. 10 shows the knee movement support device body housed in a case body of the case of the knee movement support device of the embodiment, as viewed from the outer side of the case body.
Figure 11:
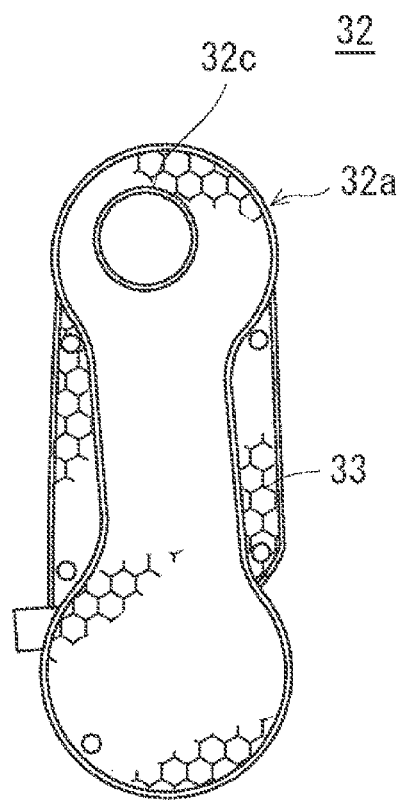
FIG. 11 shows a cover of the case of the knee movement support device of the embodiment as viewed from the outer side.
Figure 11:
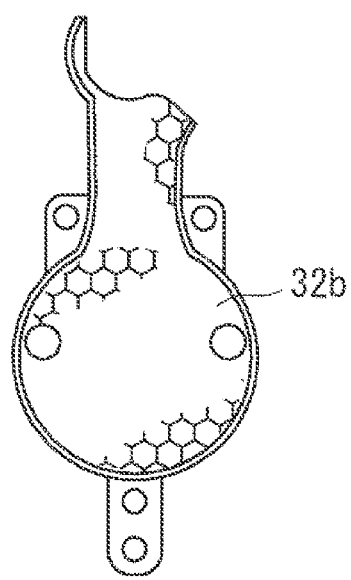
Figure 12:
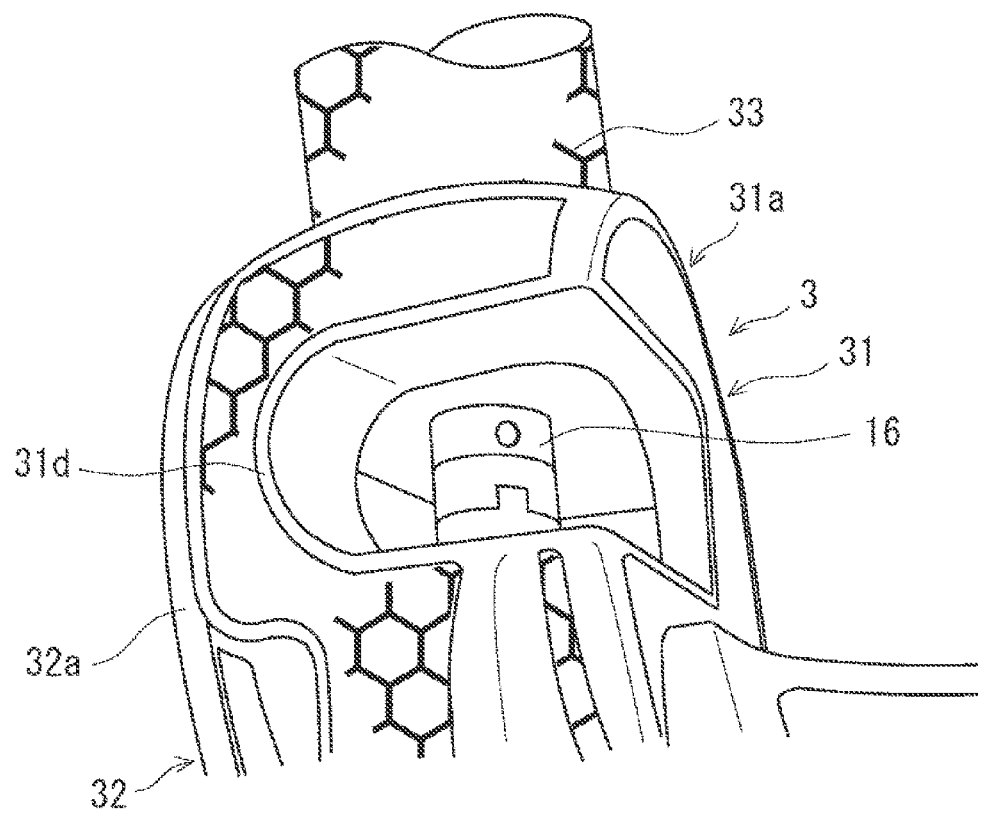
FIG. 12 is a perspective view of a part of the knee movement support device of the embodiment around an opening of the case body.
Figure 13:
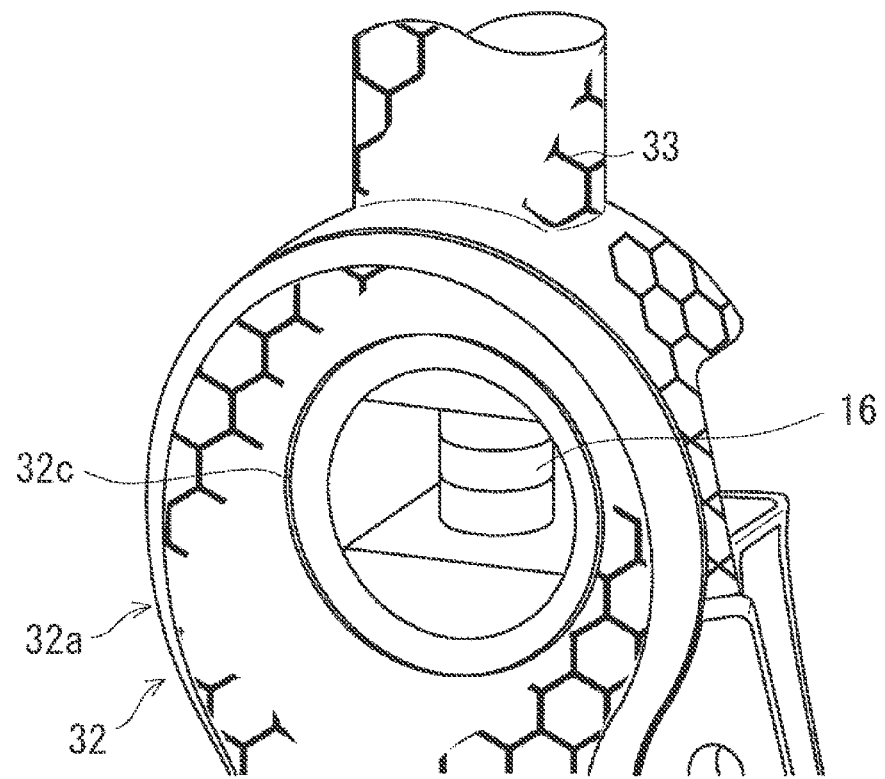
FIG. 13 is a perspective view of a part of the knee movement support device of the embodiment around an opening of the cover.

As shown in FIG. 1, the case 3 covers the knee movement support device body 2. FIG. 9 shows the case 3 of the knee movement support device 1 of the embodiment covering the knee movement support device body 2, as viewed from the outer side of the case 3. FIG. 10 shows the knee movement support device body 2 housed in a case body 31 of the case 3 of the knee movement support device 1 of the embodiment, as viewed from the outer side of the case body 31. FIG. 11 shows a cover 32 of the case 3 of the knee movement support device 1 of the present embodiment as viewed from the outer side. FIG. 12 is a perspective view of a part of the knee movement support device 1 of the present embodiment around an opening of the case body 31. FIG. 13 is a perspective view of a part of the knee movement support device 1 of the present embodiment around an opening of the cover 32. Although the knee movement support device body 2 covered by the case 3 is seen through the case 3, the knee movement support device body 2 is not shown in FIG. 9 etc. for simplicity.

As shown in FIGS. 9 to 11, the case 3 includes the case body 31 and the cover 32, and is configured to allow rotation of the lower leg link 12 with respect to the upper leg link 11. As shown in FIG. 10, the case body 31 includes a first case body 31a and a second case body 31b.

The first case body 31a houses at least a part of the upper leg link 11, and the outer part of the first case body 31a is open. The lower end of the first case body 31a is also open, and the upper leg link 11 protrudes from the lower end of the first case body 31a.

The first case body 31a preferably has a cut 31c on the rear side of its lower end so that the lower leg link 12 does not interfere with the upper leg link 11 when the lower leg link 12 is rotated with respect to the upper leg link 11.

As shown in FIG. 12, the first case body 31a preferably has an opening 31d in its front surface. The opening 31d is preferably located at substantially the same height as the operation unit 16 with at least a part of the upper leg link 11 housed in the first case body 31a. The opening 31d is therefore located in the upper part of the front surface of the case 3. The opening 31d may be located in the upper part of the rear surface of the case 3.

The second case body 31b houses at least a part of the lower leg link 12, and the outer part of the second case body 31b is open. The upper end of the second case body 31b is also open, and the upper end of the lower leg link 12 protrudes from the upper end of the second case body 31b.

As shown in FIG. 11, the cover 32 includes a first cover 32a and a second cover 32b. The first cover 32a covers the outer part of the first case body 31a. As shown in FIG. 13, the first cover 32a preferably has an opening 32c, and the opening 32c is preferably located at substantially the same height as the operation unit 16 with the outer part of the first case body 31a covered by the first cover 32a. The opening 32c is therefore located in the upper part of the outer side of the case 3.

The second cover 32b covers the outer part of the second case body 31b. As described above, the case 3 is composed of: the first case body 31a and the first cover 32a that cover the upper leg link 11; and the second case body 31b and the second cover 32b that cover the lower leg link 12. This divided structure of the case 3 allows rotation of the lower leg link 12 with respect to the upper leg link 11.

As shown in FIG. 9 etc., the case 3 preferably has a plurality of lightening holes 33 that is smaller than a preset size. For example, the preset size is preferably small enough that a human finger cannot be inserted into the lightening holes 33. The lightening holes 33 may be formed in a part of the case 3 or may be formed over the entire case 3.

This configuration reduces the weight of the case 3, and as a result, reduces the weight of the knee movement support device 1. This configuration also reduces the possibility of a person coming into contact with the knee movement support device body 2, and therefore provides improved safety. Only a part of the lightening holes 33 is shown in FIG. 9 etc. for simplicity.

The case 3 preferably includes a tongue 34 that covers the cut 31c of the first case body 31a. The tongue 34 is preferably an elastic member so that the tongue 34 can follow rotation of the lower leg link 12 when the lower leg link 12 is rotated with respect to the upper leg link 11 and comes into contact with the tongue 34.

This configuration further reduces the possibility of a person coming into contact with the knee movement support device body 2, and therefore provides further improved safety. The case 3 is not limited to the above configuration, and may have any configuration as long as the case 3 can cover the knee movement support device body 2 and allow rotation of the lower leg link 12 with respect to the upper leg link 11.

Figure 14:
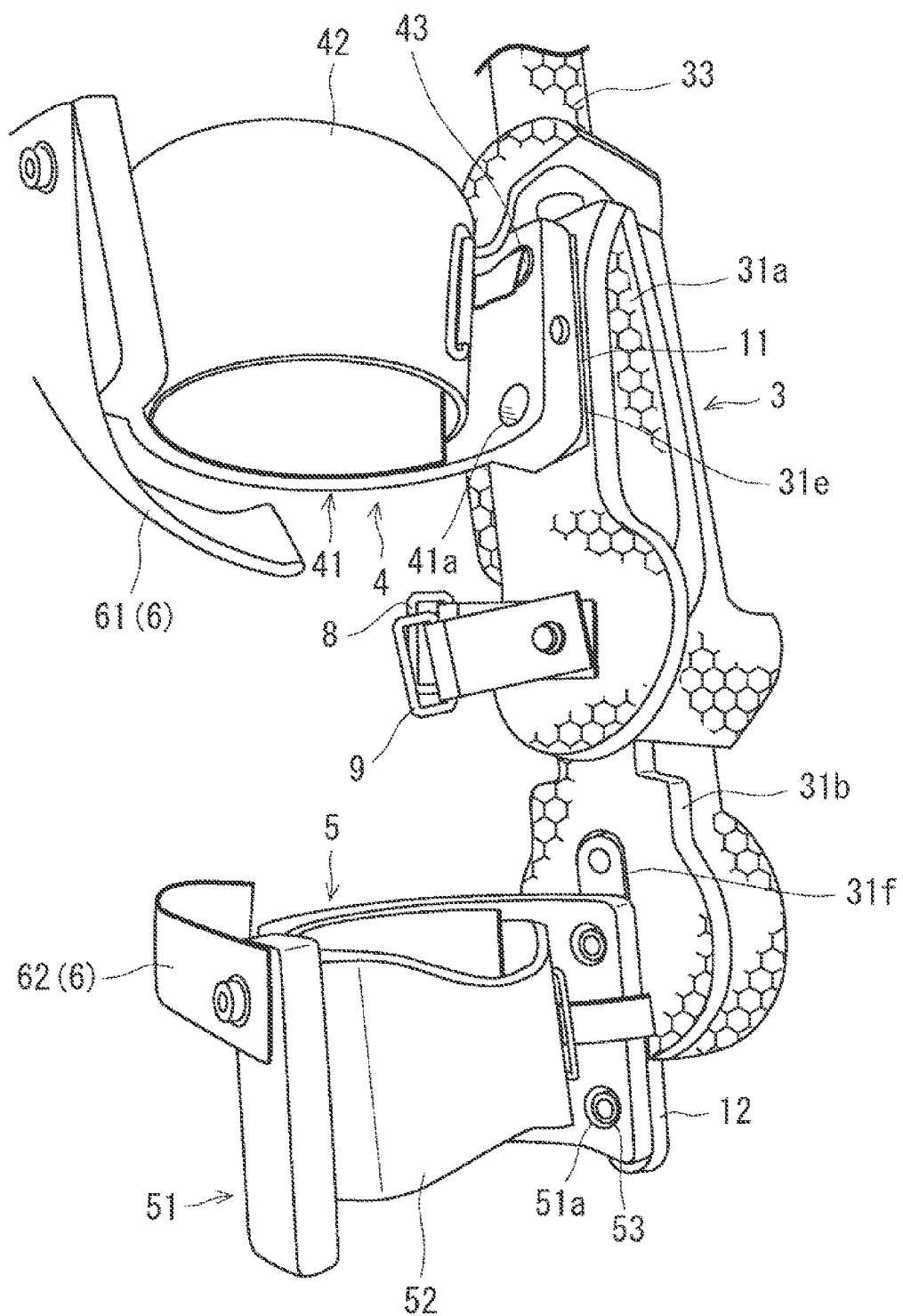
FIG. 14 is a perspective view of the knee movement support device of the embodiment as viewed from the inner side.

FIG. 14 is a perspective view of the knee movement support device 1 of the embodiment as viewed from the inner side. Although the knee movement support device body 2 covered by the case 3 is seen through the case 3, the knee movement support device body 2 is not shown in FIG. 14 for simplicity. Only a part of the lightening holes 33 is shown in FIG. 14 for simplicity.

As shown in FIG. 1, the upper leg fastening unit 4 fastens the upper leg link 11 of the knee movement support device body 2 to the upper leg UL of the user U. As shown in FIG. 14, the upper leg fastening unit 4 includes, for example, a cup 41 and a cuff 42. The cup 41 has a substantially half-cylindrical shape, and is open on its front side. That is, the cup 41 has a substantially U-shape when the cup 41 is viewed in the vertical direction.

The cup 41 has through holes 41a in its portion facing the upper leg link 11. The through holes 41a are formed at intervals in the vertical direction and extend through the cup 41. The cup 41 is fixed to the upper leg link 11 by inserting bolts 43 through the through holes 41a and screwing the bolts 43 into bolt holes in the upper leg link 11.

A part of the upper leg link 11 that is located around the bolt holes is preferably exposed through an opening 31e in the first case body 31a of the case 3. The cup 41 preferably has counterbores for the bolt heads of the bolts 43 around the through holes 41a.

The cuff 42 is a belt. For example, a part of the cuff 42 is fixed to the inner peripheral surface of the cup 41. One of two parts of a hook-and-loop fastener, namely one of hook and loop parts of a hook-and-loop fastener, is provided near one end of the cuff 42, and the other of the hook and loop parts of the hook-and-loop fastener is provided near the other end of the cuff 42.

As shown in FIG. 1, the lower leg fastening unit 5 fastens the lower leg link 12 of the knee movement support device body 2 to the lower leg LL of the user U. As shown in FIG. 14, the lower leg fastening unit 5 includes, for example, a cup 51 and a cuff 52. The cup 51 has a substantially half-cylindrical shape, and is open on its front side. That is, the cup 51 also has a substantially U-shape when the cup 51 is viewed in the vertical direction.

The cup 51 has through holes 51a in its portion facing the lower leg link 12. The through holes 51a are formed at intervals in the vertical direction and extend through the cup 51. The cup 51 is fixed to the lower leg link 12 by inserting bolts 53 through the through holes 51a and screwing the bolts 53 into bolt holes in the lower leg link 12.

A part of the lower leg link 12 that is located around the bolt holes is preferably exposed through an opening 31f in the second case body 31b of the case 3. The cup 51 preferably has counterbores for the bolt heads of the bolts 53 around the through holes 51a.

The cuff 52 is a belt. For example, a part of the cuff 52 is fastened to the inner peripheral surface of the cup 51. One of two parts of a hook-and-loop fastener, namely one of hook and loop parts of a hook-and-loop fastener, is provided near one end of the cuff 52, and the other of the hook and loop parts of the hook-and-loop fastener is provided near the other end of the cuff 52.

As shown in FIG. 1, the support belt 6 supports above and below the knee of the affected leg L of the user U. As shown in FIG. 14, the support belt 6 includes a first belt 61 and a second belt 62. The first belt 61 is preferably, for example, an elastic member.

One end of the first belt 61 is fixed to the outer peripheral surface of the opposite portion of the cup 41 of the upper leg fastening unit 4 from the upper leg link 11. One of two parts of a hook-and-loop fastener, namely one of hook and loop parts of a hook-and-loop fastener, is provided near the other end of the first belt 61.

For example, as shown in FIGS. 1 and 14, a first ring 8 is fixed to the inner surface of the upper leg link 11 at a position near the connection portion between the upper leg link 11 and the lower leg link 12. When fastening the first belt 61, the first belt 61 is threaded through the first ring 8 and folded back, and the one of the hook and loop parts of the hook-and-loop fastener provided near the other end of the first belt 61 is attached to the other of the hook and loop parts of the hook-and-loop fastener provided near one end of the first belt 61, so that the first belt 61 runs diagonally in front of the cup 41 of the upper leg fastening unit 4.

The second belt 62 is preferably, for example, an elastic member. One end of the second belt 62 is fixed to the outer peripheral surface of the opposite portion of the cup 51 of the lower leg fastening unit 5 from the lower leg link 12. One of two parts of a hook-and-loop fastener, namely one of hook and loop parts of a hook-and-loop fastener, is provided near the other end of the second belt 62.

For example, as shown in FIGS. 1 and 14, a second ring 9 is fixed to the inner surface of the upper leg link 11 at a position near the connection portion between the upper leg link 11 and the lower leg link 12. When fastening the second belt 62, the second belt 62 is threaded through the second ring 9 and folded back, and the one of the hook and loop parts of the hook-and-loop fastener provided near the other end of the second belt 62 is attached to the other of the hook and loop parts of the hook-and-loop fastener provided near one end of the second belt 62, so that the second belt 62 runs diagonally in front of the cup 51 of the lower leg fastening unit 5.

However, the configurations of the upper leg fastening unit 4, the lower leg fastening unit 5, and the support belt 6 are not limited to those described above. The upper leg fastening unit 4, the lower leg fastening unit 5, and the support belt 6 may have any configurations as long as they can fasten the knee movement support device body 2 to the upper leg UL and lower leg LL of the user U so as not to interfere with the gait of the user U.

Next, the flow of putting the knee movement support device 1 of the present embodiment on the affected leg L of the user U will be described. First, the upper leg UL of the user U is placed through the cup 41 of the upper leg fastening unit 4, and the lower leg LL of the user U is placed through the cup 51 of the lower leg fastening unit 5.

Then, the cuff 42 of the upper leg fastening unit 4 is wrapped around the upper leg UL and the hook and loop parts of the hook-and-loop fastener on the cuff 42 are attached together. The cuff 52 of the lower leg fastening unit 5 is also wrapped around the lower leg LL and the hook and loop parts of the hook-and-loop fastener on the cuff 52 are attached together. In this manner, the upper leg fastening unit 4 can be fastened to the upper leg UL, and the lower leg fastening unit 5 can be fastened to the lower leg LL.

Thereafter, the first belt 61 is threaded through the first ring 8 and folded back, and the hook and loop parts of the hook-and-loop fastener on the first belt 61 are attached together. As a result, the first belt 61 runs diagonally above the knee of the affected leg L, so that the first belt 61 can press above the knee of the affected leg L rearward.

The second belt 62 is also threaded through the second ring 9 and folded back, and the hook and loop parts of the hook-and-loop fastener on the second belt 62 are attached together. As a result, the second belt 62 runs diagonally below the knee of the affected leg L, so that the second belt 62 can press below the knee of the affected leg L rearward.

The knee movement support device 1 thus put on the affected leg L can support the affected leg L at three points. Namely, the knee movement support device 1 can support the upper leg UL by the upper leg fastening unit 4, the lower leg LL by the lower leg fastening unit 5, and the knee by the support belt 6. With this configuration, the knee movement support device 1 can be securely put on the affected leg L.

Figure 15:
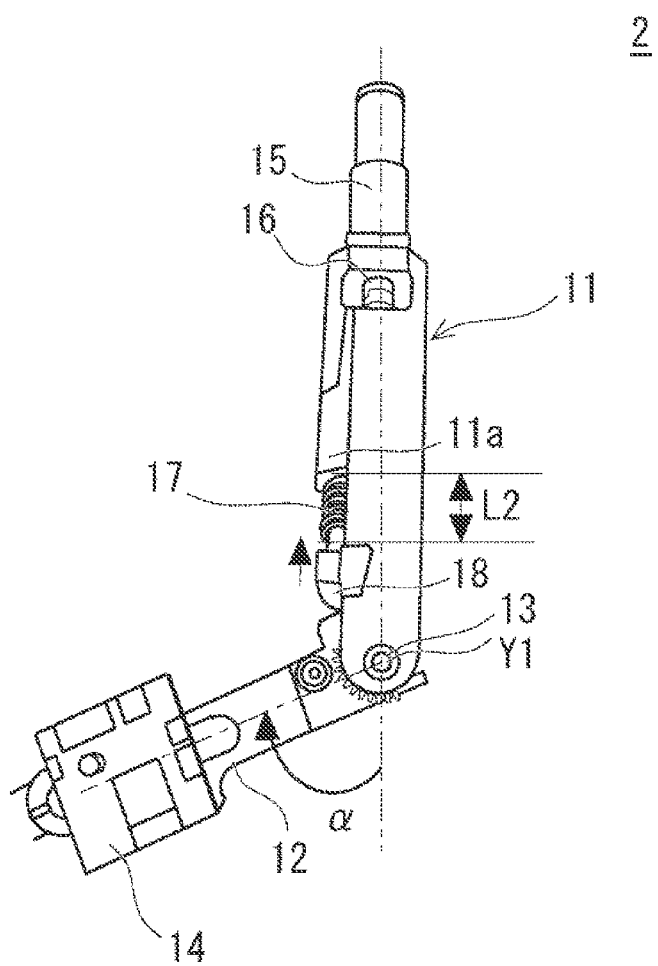
FIG. 15 is a side view of the knee movement support device of the embodiment in a bent state as viewed from the inner side.

Next, an operation example of the knee movement support device 1 of the present embodiment will be described. FIG. 15 is a side view of the knee movement support device 1 of the present embodiment in a bent state as viewed from the inner side. When the angle between the upper leg link 11 and the lower leg link 12 of the knee movement support device 1 is approximately 180 degrees, the upper leg link 11 and the roller 18 are separated by a predetermined distance L1 as shown in FIG. 5. The damper 17 receives a predetermined force from the upper leg link 11 and the roller 18 and therefore maintains a predetermined length. The spring 17c maintains the same length as the distance L1.

As shown in FIG. 15, the lower leg link 12 of the knee movement support device 1 is bent by an angle α with respect to the upper leg link 11. At this time, the cam surface 12a of the upper end of the lower leg link 12 pushes up the roller 18. As a result, the roller 18 approaches the upper leg link 11, and the distance between the roller 18 and the upper leg link 11 decreases from the distance L1 to a distance L2.

The roller 18 pushes up the rod 17b and spring 17c of the damper 17, and the damper 17 is compressed by the force received from the upper leg link 11 and the roller 18. The spring 17c thus contracts to the same length as the distance L2.

On the other hand, the lower leg link 12 receives a reaction force from the damper 17 via the roller 18. The lower leg link 12 thus receives resistance against the bending of the lower leg link 12 from the damper 17.

Figure 16:
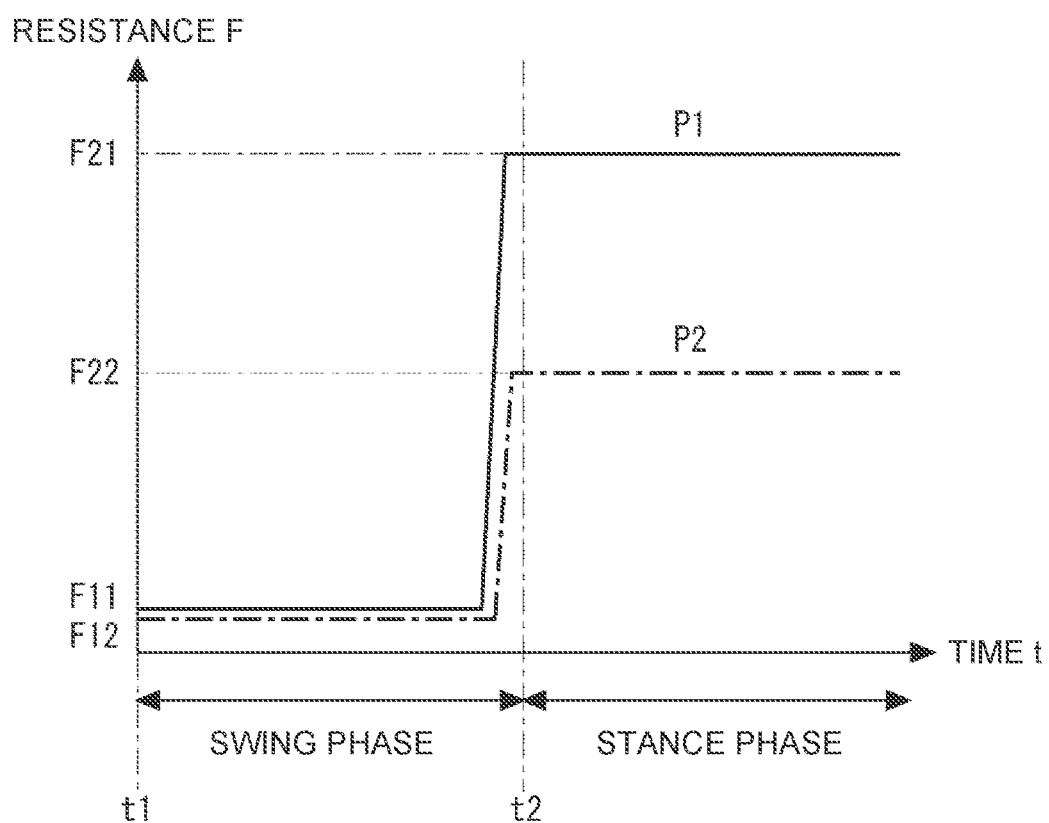
FIG. 16 is a graph showing change patterns of resistance from a damper of the knee movement support device of the embodiment.

Next, examples of a change pattern of the resistance from the damper 17 of the knee movement support device 1 of the present embodiment will be described. FIG. 16 is a graph showing change patterns of the resistance from the damper 17 of the knee movement support device 1 of the present embodiment. As shown in FIG. 16, there are resistance change patterns P1, P2.

When the user U wants high resistance F during the stance phase of the gait, a person such as the user U or a helper selects the resistance change pattern P1. When the user U wants low resistance F during the stance phase of the gait, a person such as the user U or a helper selects the resistance change pattern P2.

In the resistance change pattern P1, a resistance value F11 is maintained from the start time t1 of the swing phase to immediately before the start time t2 of the stance phase. The resistance value is then increased to a value F21 in the period from immediately before the start time t2 of the stance phase to the start time t2 of the stance phase. The resistance value F21 is maintained after the start time t2 of the stance phase. The resistance is thus changed according to the swing phase and the stance phase.

In the resistance change pattern P2, a resistance value F12 is maintained from the start time t1 of the swing phase to immediately before the start time t2 of the stance phase. The resistance value is then increased to a value F22 in the period from immediately before the start time t2 of the stance phase to the start time t2 of the stance phase. The resistance value F22 is maintained after the start time t2 of the stance phase. The resistance is thus changed according to the swing phase and the stance phase.

The resistance value F21 of the resistance change pattern P1 is larger than the resistance value F22 of the resistance change pattern P2. The resistance change pattern P1 is therefore more suitable for a user U who wants high resistance F after the start time t2 of the stance phase than the resistance change pattern P2.

The resistance change pattern P2 is more suitable for a user U who wants low resistance F after the start time t2 of the stance phase than the resistance change pattern P1. By selecting the resistance change pattern P1 or P2, the resistance from the damper 17 can be changed for each user U.

Next, the flow of adjusting the resistance from the damper 17 of the knee movement support device 1 of the present embodiment will be described. When increasing the resistance from the damper 17, a person such as the user U or a helper rotates the operation unit 16 in one direction through the opening 31d or opening 32c of the case 3.

The sectional area of the flow path of the damper fluid in the damper 17 thus decreases accordingly, and the damper coefficient k increases, and as a result, the resistance F from the damper 17 increases. For example, the resistance change pattern P1 or P2 is translated upward in FIG. 16.

When decreasing the resistance from the damper 17, a person such as the user U or a helper rotates the operation unit 16 in the other direction through the opening 31d or opening 32c of the case 3. The sectional area of the flow path of the damper fluid in the damper 17 thus increases accordingly, and the damper coefficient k decreases, and as a result, the resistance F from the damper 17 decreases. For example, the resistance change pattern P1 or P2 is translated downward in FIG. 16.

As described above, in the knee movement support device 1 of the present embodiment, the resistance from the damper 17 can be easily adjusted by rotating the operation unit 16 by a person such as the user U or a helper.

The knee movement support device 1 of the present embodiment includes the operation unit 16 for adjusting the resistance from the damper 17. Therefore, a person such as the user U or a helper can easily adjust the resistance from the damper 17 when the user U does walking training.

Moreover, the damper 17 is not configured to generate resistance by receiving power supply. It is therefore not necessary to supply power to the damper 17 when adjusting the resistance from the damper 17, and the resistance from the damper 17 can be more easily adjusted.

Since the operation unit 16 is located in the upper part of the knee movement support device 1, the user U can adjust the resistance from the damper 17 without significantly changing his or her posture during walking training.

Moreover, the knee movement support device body 2 of the knee movement support device 1 of the present embodiment is covered by the case 3. This configuration reduces the possibility of a person coming into contact with the knee movement support device body 2, and therefore provides improved safety.

In the case where the case 3 has the lightening holes 33, reduction in weight of the knee movement support device 1 and improved safety can be achieved. In the case where the case 3 has the openings 31d, 32c, a person can easily operate the operation unit 16 from the outside of the case 3. In the case where the openings 31d, 32c are located at substantially the same height as the operation unit 16, the operability of the operation unit 16 can be improved.

In the knee movement support device 1 of the present embodiment, the damper coefficient k is changed as the sectional area of the flow path of the damper fluid changes with rotation of the resistance changing shaft 17a. The output shaft of the drive unit 15 is connected to the resistance changing shaft 17a via the operation unit 16. Therefore, with a relatively simple mechanism, the resistance from the damper 17 can be adjusted by both the drive unit 15 and the operation unit 16.

The present disclosure is not limited to the above embodiment, and can be modified as appropriate without departing from the spirit and scope of the present disclosure. The present disclosure may be carried out by combining the above embodiment and examples thereof as appropriate.

For example, in the above embodiment, the upper leg link 11 includes the drive unit 15, the operation unit 16, the damper 17, and the roller 18, and the lower leg link 12 includes the control device 14. However, the upper leg link 11 may include at least one of the drive unit 15, the operation unit 16, the damper 17, the roller 18, and the control device 14, and the lower leg link 12 may include the rest.

For example, in the above embodiment, the operation unit 16 has a cylindrical shape and is located between the output shaft of the drive unit 15 and the resistance changing shaft 17a protruding from the upper end of the damper 17. However, the operation unit 16 may be a button type or slide type mechanism as long as the operation unit 16 can change the damper coefficient k of the damper 17.

For example, the configuration of the knee movement support device body 2 of the above embodiment is illustrative, and may be any configuration as long as a person can adjust the resistance from the damper 17 from the outside.

What is claimed is:

1. A knee movement support device that is worn on a leg of a user, comprising:
    a damper that provides resistance against a direction in which a knee joint of the leg bends;
    an adjuster that is operated by a person and is configured to adjust the resistance from the damper;
    a control device coupled to the adjuster, the control device being configured to send a resistance signal; and
    a drive unit coupled to the adjuster, the drive unit including a motor and being configured to apply a rotational power based on the resistance control signal.

2. The knee movement support device according to claim 1, wherein the adjuster is located above the damper.

3. The knee movement support device according to claim 1, further comprising a driver connected to the damper such that the resistance from the damper is changed, wherein the adjuster is located on an output shaft of the driver.

4. The knee movement support device according to claim 1, further comprising a case surrounding the damper, wherein the case has an opening that allows the adjuster to be operated from outside of the case.

5. The knee movement support device according to claim 4, wherein the opening is located in an opposite portion of the case from the user wearing the knee movement support device on the leg, or is located on a front side of the case or on a rear side of the case, the front side being a front side in a front-rear direction of the user, the rear side being a rear side in the front-rear direction of the user.

6. The knee movement support device according to claim 4, wherein the case has a plurality of holes that is smaller than a preset size.

7. The knee support device according to claim 1 further comprising:
    a reception unit located inside the control device;
    a detection unit that is configured to send a knee angle value to the reception unit, the knee angle value identifies whether a knee of the user is in a swing phase or in a stance phase; and
    a communication terminal that is configured to receive a resistance change pattern from a user and send the resistance change pattern to the reception unit,
    wherein the resistance change pattern comprises a first resistance value when the knee of the user is in the swing phase and a second resistance value when the knee of the user is in the stance phase.

* * * * *